United States Patent
Maier et al.

(10) Patent No.: US 6,928,037 B1
(45) Date of Patent: Aug. 9, 2005

(54) METHOD FOR PLAYING BACK RECORDING MEDIUM

(75) Inventors: Jens Maier, Giessen (DE); Thomas Freitag, Algermissen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/509,108

(22) PCT Filed: Sep. 16, 1998

(86) PCT No.: PCT/DE98/02741

§ 371 (c)(1),
(2), (4) Date: May 31, 2000

(87) PCT Pub. No.: WO99/16074

PCT Pub. Date: Apr. 1, 1999

(30) Foreign Application Priority Data

Sep. 20, 1997 (DE) .......................................... 197 41 594

(51) Int. Cl.⁷ .......................... G11B 27/10; G11B 27/32; G11B 27/11

(52) U.S. Cl. ................................ 369/47.28; 369/53.24; 369/53.34; 369/30.28; 369/30.04; 369/30.1; 369/44.28; 369/30.13; 434/307 A

(58) Field of Search .......................... 369/44.27, 44.29, 369/53.23, 53.28, 53.24, 47.28, 53.34, 30.28, 47.31, 30.1, 30.08, 47.23, 47.34, 30.04, 275.4, 44.13; 434/307 A, 307 R, 318; 386/125, 65; 84/610, 477 R, 639, 645

(56) References Cited

U.S. PATENT DOCUMENTS

| | | | |
|---|---|---|---|
| 5,263,010 A | | 11/1993 | Amemiya et al. |
| 5,337,296 A | * | 8/1994 | Okubo ....................... 369/30.1 |
| 5,570,340 A | * | 10/1996 | Lee et al. ................. 369/47.31 |
| 5,574,239 A | * | 11/1996 | Kang et al. .................... 84/610 |
| 5,683,253 A | * | 11/1997 | Park et al. .............. 434/307 A |
| 5,768,252 A | * | 6/1998 | Yokota ..................... 369/30.04 |
| 5,822,283 A | * | 10/1998 | Bos et al. ................. 369/30.28 |
| 5,862,123 A | * | 1/1999 | Horie et al. ............. 369/275.4 |
| 5,889,745 A | * | 3/1999 | Aramaki ................... 369/53.34 |
| 5,982,727 A | * | 11/1999 | Kondo et al. ............ 369/53.24 |
| 6,283,764 B2 | * | 9/2001 | Kajiyama et al. ....... 434/307 A |

FOREIGN PATENT DOCUMENTS

| | | |
|---|---|---|
| DE | 37 19 217 | 12/1988 |
| EP | 0 376 756 | 7/1990 |
| EP | 0 583 638 | 2/1994 |
| JP | 08 212756 | 8/1996 |
| JP | 09 106659 | 4/1997 |
| JP | 10 241264 | 9/1998 |

* cited by examiner

*Primary Examiner*—William Korzuch
*Assistant Examiner*—Kim-Kwok Chu
(74) *Attorney, Agent, or Firm*—Kenyon & Kenyon

(57) ABSTRACT

A method for playing a recording medium, in particular an optical storage disc, used to access titles more quickly. Stored in a run-in area of the recording medium is at least one address area that includes at least one address of a beginning of a title stored on the recording medium. The recording medium is played in a player having a read device. When the at least one address area is read out, the at least one address of a title beginning is converted to a start time of exactly one time unit and stored in a memory, with the start time corresponding approximately to the playing time of the recording medium up to the addressed title beginning. To position the read device at the beginning of the title, the track jump time is calculated directly from the corresponding start time stored in the memory.

1 Claim, 2 Drawing Sheets

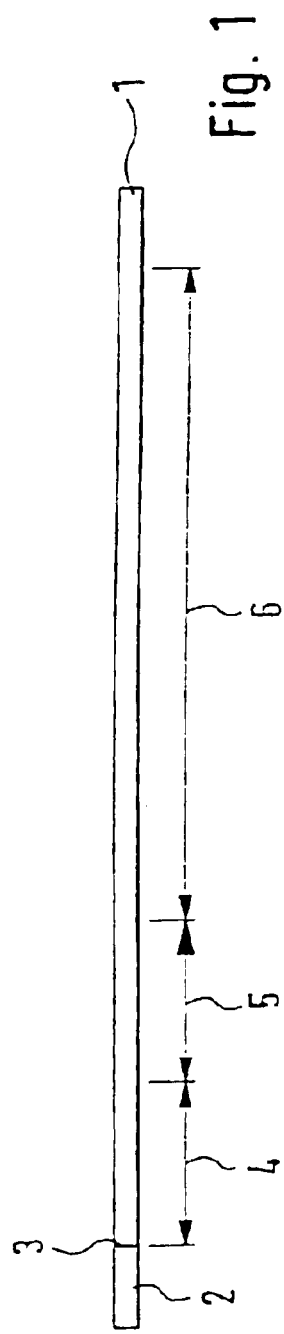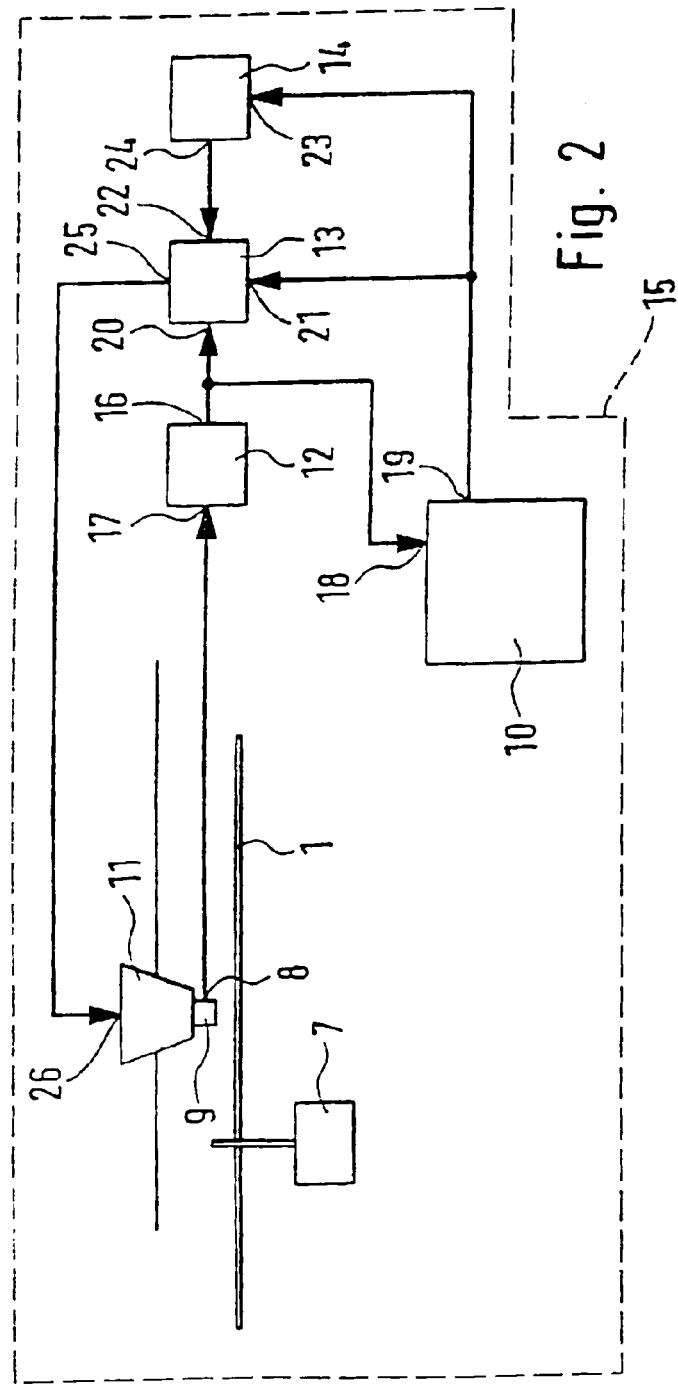

US 6,928,037 B1

METHOD FOR PLAYING BACK RECORDING MEDIUM

BACKGROUND INFORMATION

A method and a device for storing TOC (table of contents) information of a storage medium are known from the publication Patent Abstracts of Japan, Vol. 097, No. 008, Aug. 29, 1997 and JP 09106659A. The total number of music titles and the start/stop addresses of the music titles are stored in a run-in area of the storage medium in the form of TOC information. These addresses are provided in the form of a combination of multiple time units, namely minutes, seconds, and frames. Depending on the number of music titles stored on the storage medium, the addresses formed by the time units are stored more or less precisely in a read/write memory after inserting the storage medium designed as a compact disc into a player.

A method for playing CDs in a compact disc player, in which the time prior to starting the playback of a selected music title is shortened, is described in German Patent No. 38 07 181. A cumulative total time code recorded in the CD lead-in area is read out, and a predetermined code is detected during this read-out. If this predetermined code cannot be detected in the cumulative total time code, a frame calculation is carried out to tell the scanner to jump across the CD tracks and read out a different cumulative total time code, whereupon, after the predetermined code has been read out, necessary data is output from the lead-in area. According to a music selection method, only the total playback time and the total number of music titles are read out from the total time code. After selecting a specific music title, the system calculates an average time per music title from the total playback time and the total number of music titles, and the system searches for the selected music number according to the average time calculated in this manner. The CD player can therefore use a low-capacity memory and can thus be produced economically. According to the system, the scanner is also essentially moved to the position of the selected music title without reading out the addresses provided for the music titles recorded on the CD.

SUMMARY OF THE INVENTION

The method according to the present invention has an advantage over the related art in that the read device can be quickly and precisely positioned at the beginning of a selected title even if the title playback time varies from the average time. The method eliminates the need to determine the average time of each title, and the read device is accurately positioned at the beginning of the title independently of the playback time of the individual titles. Because the at least one address of a title beginning can be converted to and stored as a start time of exactly one time unit, the positioning time, or the number of tracks to be jumped, can be calculated directly from the start time stored in the memory, even if the address of the title beginning stored in the address area of the recording medium is represented by a combination of different time units, for example minutes and seconds. Converting the combined time units to exactly one time unit, for example to seconds, is no longer necessary prior to each read device track jump, thus saving time.

One particular advantage lies in the fact that, if a pause is detected at the beginning of a title, the pause duration is determined and added to the start time. Accounting for a pause at the beginning of a title when determining the start time makes it possible to further shorten the access time for a selected title, since the read device also jumps the pause at the beginning of the title when performing a track jump, so that a pause of this type does not have to be played or skipped by additional jumps.

A further advantage is that the time unit is selected depending on the accuracy needed for calculating one track jump. This makes it possible to convert the start time directly to the jump time or to the number of tracks to be jumped when the read device performs a track jump without any further loss of time.

BRIEF DESCRIPTION OF THE DRAWINGS

FIG. 1 shows a cross-section of a recording medium designed as an optical storage disc.

FIG. 2 shows a block diagram of a player with the recording medium inserted.

DETAILED DESCRIPTION

Figure 3:
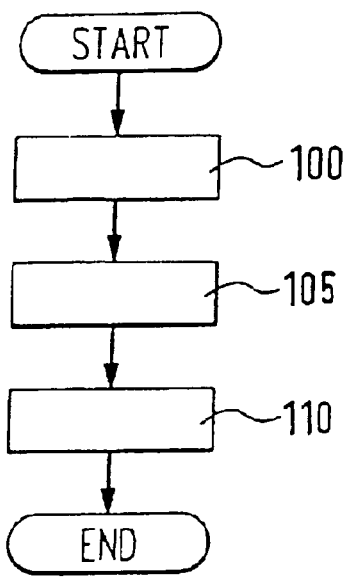
FIG. 3 shows a flowchart for evaluating an address area on a recording medium.

In FIG. 2, 15 designates a player designed as a compact-disc player into which is inserted a recording medium 1, designed as an optical storage disc, for example a compact disc. Compact disc 1 is rotated by a CD drive 7, and the recordings stored on it are scanned, i.e., read out, by a read device 9. Read device 9 is located on a positioning arrangement 11, which moves read device 9 across compact disc 1 in a radial direction. A signal output 8 of read device 9 is connected to an input 17 of a decoder 12. An output 16 of decoder 12 is connected to an input 18 of an evaluation circuit 10 and to a first input 20 of a memory 13. An output 19 of evaluation circuit 10 is connected to a second input 21 of memory 13 and to an input 23 of an adder 14.

An output 24 of adder 14 is connected to a third input 22 of memory 13. An output 25 of memory 13 is connected to an input 26 of positioning arrangement 11.

FIG. 1 shows a cross-sectional view of a recording medium 1 designed as a compact disc. An area 3 in which no data is recorded lies next to a central CD hole 2 for adjusting compact disc 1 on a turntable, which is not illustrated in FIG. 2. This area is followed by a run-in area 4 which contains information about the total number of titles recorded on the compact disc, the total playing time of the titles in minutes, seconds, and frames measuring, for example, one $75^{th}$ of a second, and the address of each title. Each of the addresses stored in run-in area 4 relates to the beginning of one corresponding title and is stored in one or more address areas of run-in area 4. At least one address for one title is provided in run-in area 4. A program area 5 follows run-in area 4 and extends all the way to a CD edge 6, which varies depending on the CD size, the titles being recorded in this program area. The addresses for the beginning of each title are indicated in run-in area 4 in the form of a start time for the corresponding title in minutes and seconds. The start time corresponds approximately to the playing time of recording medium 1 from the beginning of program area 5 to the addressed title beginning.

After compact disc 1 is inserted into player 15, the address data is converted to a single time unit the first time read device 9 scans run-in area 4, making it possible to convert each start time to the corresponding, necessary jump time or to the number of tracks to be jumped. The time unit is selected depending on the accuracy needed to calculate one track jump more quickly. Because the jump time accuracy or the number of tracks to be jumped can vary by one second, one second is selected as the time unit.

The address data scanned by read device 9 in run-in area 4 is first decoded by decoder 12 and then supplied to evaluation circuit 10, which converts the address data for the start times, provided in minutes and seconds, to seconds and stores it in memory 13. The jump time or the number of tracks to be jumped to position read device 9 from run-in area 4 or from any position in program area 5 to the start of the selected title in program area 5 of compact disc 1 can then be calculated by positioning arrangement 11 directly from the start times in seconds stored in memory 13, i.e., without any further time unit conversions. When the user selects a title, the current address of read device 9 is first determined in the form of the playing time from the beginning of program area 5 to the current position of read device 9 by scanning additional encoded information that is stored on compact disc 1. The start time of the selected title is then determined from memory 13, and a relative jump time or number of tracks to be jumped on compact disc 1 is calculated from this start time and the current address of read device 9. According to the calculated jump time or the number of tracks to be jumped, positioning arrangement 11 then moves read device 9 to the beginning of the selected title on compact disc 1, and this title is played.

If decoder 12 detects a pause in the data read by read device 9 at the beginning of a title, evaluation circuit 10 determines the pause duration, and adder 14 adds this duration to the corresponding start time stored in memory 13, so that the next time the user selects this title, positioning arrangement 11 accounts for the pause during the track jump, and either the pause is not played or must be avoided by additional jumps. This further speeds up access to a title that begins with a pause.

FIG. 3 shows a flowchart for evaluation circuit 10 when evaluating the addresses read in run-in area 4. At a program point 100, the address data, i.e., start times, of the titles recorded in program area 5 of compact disc 1 are read out of run-in area 4 by read device 9, then evaluated by decoder 12, and finally supplied to evaluation circuit 10 as data in the form of minutes and seconds. At program point 105, evaluation circuit 10 converts these start times to seconds. At program point 110, the converted start times are stored in memory 13. The program then leaves this subroutine.

Figure 4:
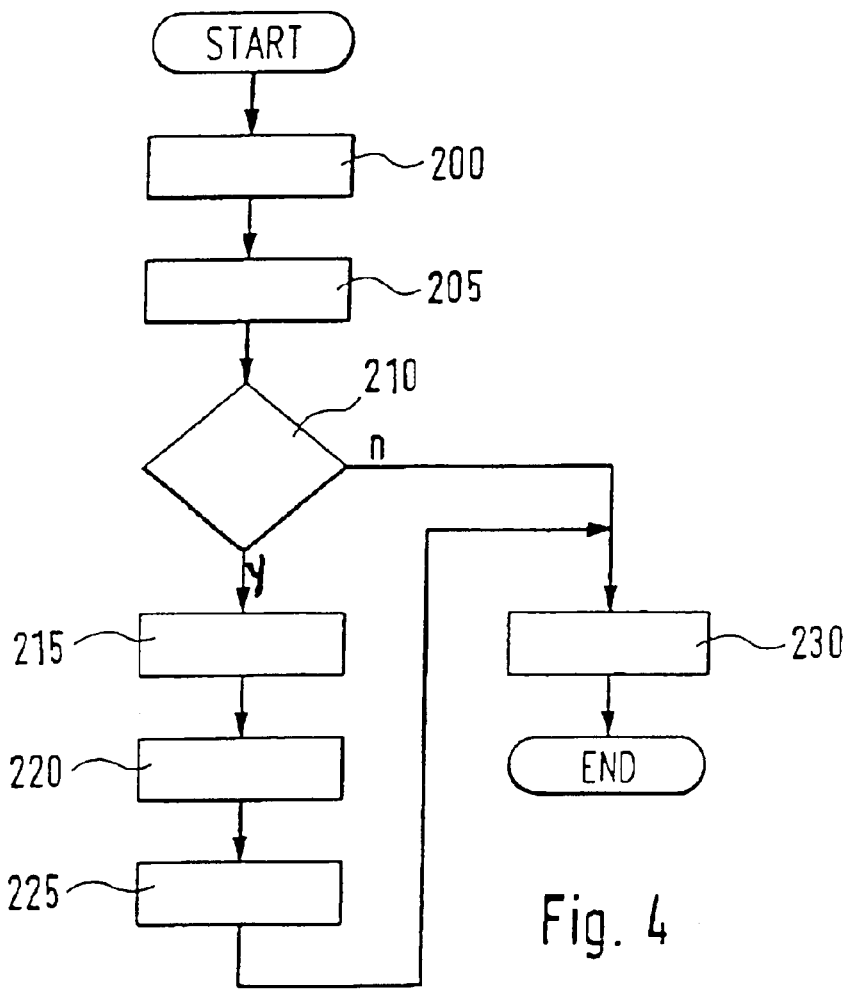
FIG. 4 shows a flowchart for selecting a title.

FIG. 4 shows a flowchart for selecting a title. At a program point 200, positioning arrangement 11 determines the current address of read device 9 from the additional encoded information scanned by read device 9 on compact disc 1, converts this address to the seconds time unit and, if the address is not already included in the seconds time unit of the additional encoded data, accesses the start time corresponding to the selected title in memory 13, which is also present in the one-second time unit, and, from this start time and the current address of read device 9, calculates a corresponding jump time or number of tracks to be jumped for positioning arrangement 11 to position read device 9 at the beginning of the selected title.

At a program point 205, positioning arrangement 11 performs a jump based on the calculated jump time or the number of tracks to be jumped before reaching the beginning of the selected title. At a program point 210, evaluation circuit 10 checks whether a pause occurs at the beginning of a title. A pause of this type can, for example, be identified by a special index ID on a corresponding recording track of compact disc 1 and decoded by decoder 12. If so, the sequence branches to program point 230, otherwise it branches to program point 215. At program point 215, selection circuit 10 determines the pause duration. At program step 220, adder 14 adds the pause duration to the corresponding start time in memory 13. At program point 225, the previous start time is overwritten by the new start time resulting from adding the pause duration. The sequence then branches to program point 230. At program point 230, the recordings of the selected title on compact disc 1 scanned by read device 9 are played by a playback device, which is not illustrated in FIG. 2. The program then leaves this subroutine.

The present invention is not limited to the use of optical storage discs as the recording medium or compact disc players as the player, but instead can be generally applied to all players for recording media on which titles are addressed in the form of start times that are stored on the recording medium.

What is claimed is:

1. A method for playing a recording medium in a player, the recording medium having a run-in area and at least one address area stored in the run-in area, the at least one address area containing at least one address of a beginning of a title stored on the recording medium in the form of a combination of multiple time units, the player having a read device and a memory, the method comprising the steps of:

when the at least one address area is read out, converting the at least one address of the beginning of the title to a start time in the form of exactly one time unit, the start time substantially corresponding to a playing time of the recording medium from a beginning of a program area to a beginning of an addressed title;

storing the start time in the memory;

calculating a track jump time, for positioning the read device at the beginning of the title, directly from at least one corresponding start time stored in the memory; and if a pause is detected at the beginning of the title, determining a pause duration and adding the pause duration to the start time.

* * * * *